United States Patent [19]

Stanley

[11] Patent Number: 4,844,924

[45] Date of Patent: Jul. 4, 1989

[54] ESTERIFIED DIETARY FIBER PRODUCTS AND METHODS

[75] Inventor: Keith D. Stanley, Decatur, Ill.

[73] Assignee: A. E. Staley Manufacturing Company, Decatur, Ill.

[21] Appl. No.: 98,109

[22] Filed: Sep. 16, 1987

[51] Int. Cl.$^4$ .............................................. A23L 1/277
[52] U.S. Cl. ..................................... 426/258; 426/618; 426/804
[58] Field of Search ...................... 426/93, 29, 31, 262, 426/254, 255, 258, 259, 618, 804

[56] References Cited

U.S. PATENT DOCUMENTS

| | | | |
|---|---|---|---|
| 2,478,043 | 8/1949 | Evans | 426/253 |
| 4,325,883 | 4/1982 | Jones et al. | 260/423 |
| 4,341,805 | 7/1982 | Chaudhary | 426/29 |
| 4,391,831 | 7/1983 | Knobloch | 426/93 |
| 4,565,702 | 1/1986 | Morley et al. | 426/93 |
| 4,568,557 | 2/1986 | Becker et al. | 426/93 |
| 4,619,831 | 10/1986 | Sharma | 426/93 |
| 4,673,578 | 6/1987 | Becker et al. | 426/93 |

FOREIGN PATENT DOCUMENTS 109974  9/1978  Japan .

OTHER PUBLICATIONS

Hawley "The Condensed Chemical Dictionary" Van Nostrand Reinhold Co. 10th Edition (1982) pp. 534–535 & 615.

Morrison et al., "Organic Chemistry" Second Edition (1966) Allyn & Bacon Inc. Publishers, pp. 667 and 798.

Kirk-Othmer, Encyclopedia of Chemical Technology, vol. 7, pp 628–635 (3d ed. 1979).

D. Manchester et al., "The Brightening of Groundwood" Svenski Papperstidning, vol. 63, pp. 699–706 (Oct. 1960).

Chemical Abstracts 86:74718N (1977).

*Primary Examiner*—R. B. Penland
*Attorney, Agent, or Firm*—Michael F. Campbell; J. Daniel Wood

[57] ABSTRACT

A dietary fiber material, e.g. corn bran, having improved color stability is provided. The material is esterified prior to bleaching to decrease the color of the material. Typical dietary fiber materials are the fiber materials produced by the milling of plant seeds such as cereal grains and oilseeds. The esterification of the dietary fiber material corn bran prior to bleaching results in a lighter colored dietary fiber product having enhanced acceptance as a dietary fiber supplement in a variety of food products.

10 Claims, No Drawings

ESTERIFIED DIETARY FIBER PRODUCTS AND METHODS

FIELD OF THE INVENTION

In one aspect, this invention relates to a method of improving the utility of dietary fiber material and to the product of such a method. In another aspect, this invention relates to a method of decreasing the color of dietary fiber material and to the product of such a method.

BACKGROUND OF THE INVENTION

The use of fiber material as a dietary fiber supplement is well known, e.g. Kirk-Othmer, Encyclopedia of Chemical Technology, Vol. 7, p. 628, 635 (3d ed. 1979). While consumers are familiar with the dark color of high-bran, ready-to-eat breakfast cereals, it would be desirable to decrease the color of fiber material to allow its inclusion in a variety of foodstuffs without adversely affecting the color of the foodstuff.

Japanese Patent No. 53-109974, (Hyashi) published Sept. 26, 1978, describes a method of bleaching wheat bran to be used in a seasoned wheat bran paste that is added to Japanese white radish (daikon) in the production of pickled Japanese white radish (takuan). Raw wheat bran is subjected to oxidative bleaching (e.g. with hydrogen peroxide) followed by reductive bleaching (e.g. with sodium hyposulfite). While conventional bleaching methods effect a decrease in the color of corn bran, it is desirable to further decrease the color of corn bran and thus improve its acceptance as a dietary fiber supplement.

SUMMARY OF THE INVENTION

This invention relates to a method of improving the utility of dietary fiber material comprising reacting dietary fiber material with an esterifying agent. This invention also relates to the product of such a method. This invention also relates to a method of decreasing the color of dietary fiber material comprising reacting dietary fiber material with an esterifying agent to form an esterified dietary fiber material and then bleaching said esterified dietary fiber material and to a bleached, esterified dietary fiber material produced by said method.

In preferred embodiments, the dietary fiber material corn bran is reacted with a lower aliphatic carboxylic acid, acid halide, ester, or anhydride and then bleached with one or more bleaching agents, at least one of said agents being an oxidative bleach. In particularly preferred embodiments, the bleaching is accomplished by first oxidatively bleaching the dietary fiber material reaction product and then reductively bleaching the oxidatively bleached product.

It has been found that corn bran that is reacted with an esterifying agent prior to bleaching has improved, i.e. decreased, color as compared to unreacted or post-reacted corn bran. This improvement is believed to result from the improved color stability of minor constituents of the corn bran, e.g. lignin and/or other phenolic materials, which results from esterification of materials in the corn bran.

DETAILED DESCRIPTION OF THE INVENTION

The esterified dietary fiber of this invention is prepared from a source of dietary fiber. Dietary fiber material, as used herein, means a material comprised of dietary fiber derived from a plant source. Such sources include vegetable, cereal and fruit sources. Typical sources are the fiber materials produced by the milling of plant seeds, e.g. cereal grains such as corn, wheat and rice and oilseeds such as soybean, sunflower and cottonseeds.

The preferred dietary fiber is corn bran. Corn bran is obtained from the grain by conventional milling techniques. In wet corn milling, which is the most common source of corn bran, corn kernels are steeped in dilute sulfurous acid to soften the outer layers of the grain. The moist corn kernels are then lightly ground in a mill to separate the intact germ from the remainder of the kernel. The germ is separated from the resulting cracked kernels by flotation of the germ. The resulting cracked kernels are powdered in a burr mill and the hulls (i.e. bran) are removed by screening the bran from the remaining starch and protein. The bran, which contains protein bound in a matrix comprised of hemicelluloses, cellulose and other constituents, are commonly used as, or to produce, a corn gluten feed.

As indicated above, the corn bran starting material of this invention is typically obtained by powdering shelled and degermed corn (Zea mays) and screening the crude bran from the powdered starch and protein. Accordingly, the crude bran particles initially have a mean particle diameter in at least one dimension greater than the powdered starch and protein from which it is screened. A major portion of the weight of the bran will typically have a mean particle diameter in at least one dimension greater than about 1mm. The physical and chemical characteristics of the crude bran as produced by milling can be further modified prior to esterifying, e.g. particle size reduction, moisture content reduction, component extraction, etc. In particular, the crude corn bran is generally mechanically refined, i.e. reduced in particle size, by conventional techniques, examples of which include milling dried, crude bran in a classifying pin mill. The crude bran is generally mechanically refined sufficient to allow at least 80 percent to pass a No. 20 mesh screen (850 micrometer openings). Preferred refined bran will pass at least 80% through a No. 60 mesh screen (250 micrometer openings), and most preferred will pass at least 95% through a No. 100 mesh screen (150 micrometer openings) and 90% through a No. 200 mesh screen (75 micrometer openings).

The major constituents of dietary fiber materials are cellulose, and other polysaccharides (e.g. hemicellulose, pectin, and plant mucilages). The fiber materials also contain phenolic compounds such as lignin and/or phenolic moieties which are also susceptible to esterification. The carboxylate esterifying agents useful in this invention are compounds capable of reacting with the constituents of dietary fiber to form covalent bonds thereto through hydroxyl groups in the fiber.

Typical esterifying agents are carboxylic acids, or halides, esters, or anhydrides thereof. Particularly preferred esterifying agents are lower aliphatic ($C_1$–$C_4$) carboxylic acids, or halides, esters, or anhydrides thereof. Examples of suitable esters include the esters of the lower alkanols, e.g. methanol and ethanol. Examples of suitable acid halides, include the acid chlorides and the acid bromides. Anhydrides and halides are especially preferred as esterifing agents because of their high reactivity with corn bran under mild reaction conditions which do not promote formation of color bodies in the dietary fiber material. Acetic anhydride is an especially preferred esterifying agent, not only because of its high reactivity under mild conditions, but also because of the ease of removing and treating unreacted anhydride and/or by-products (e.g. acetic acid and/or an alkali metal acetate).

The amount of esterifying agent reacted with said dietary fiber material can vary broadly, but should be sufficient to significantly decrease, i.e. a decrease perceptible to an unaided human observer, the color of the fiber upon bleaching as compared with dietary fiber not reacted with an esterifying agent before bleaching. Typical levels of acetylation with acetic anhydride will range from about 0.1% to about 5% d.s.b. acetyl (—C-(O)—CH$_3$) by weight of reacted dietary fiber material. Typical means of measuring the percent acetyl of the reacted dietary fiber included nuclear magnetic resonance (NMR) integration techniques and ion chromatography of saponified, reacted dietary fiber. The percent acetyl of typical crude unreacted corn bran is generally very low, e.g. less than 500 ppm, in comparison to the percent acetyl of acetylated corn bran. Thus, it may not be necessary, particularly with at least moderate levels of acetylation (e.g. from about 1% to 2%), to measure the percent acetyl of the corn bran starting material to establish a baseline or control against which the reacted product is measured.

The dietary fiber material and esterifying agent can be admixed in any manner which will allow the material and agent to come into reactive association. Typically the fiber material is slurried with a liquid compatible with the fiber material and esterifying agent, e.g. water, and the esterifying agent is added to the slurry. An alkaline catalyst is preferably also present in the slurry. Such slurries typically contain less than 20% solids, by weight. However, it is contemplated that other techniques, e.g. fluidized bed techniques, will be useful to place the fiber material and esterifying agent in reactive association.

As noted above, the reaction conditions under which the fiber material is reacted with an esterifying agent should be mild to avoid formation of color bodies during the reaction. Such conditions generally include mildly alkaline (e.g. pH of 8-10) slurry reactions conducted below the boiling point of the liquid media of the slurry. If the reacted fiber material is isolated prior to bleaching, the condiitons under which it is isolated should also be mild.

The esterified dietary fiber material will have utility as a fibrous material in a variety of industrial and/or food applications, particularly those where the increased color stability of the dietary fiber resulting from esterification will be advantageous. A particularly preferred utility is in preparing bleached dietary fiber which is subsequently used as a dietary fiber supplement.

The esterified dietary fiber can be bleached, typically by otherwise conventional bleaching techniques, to decrease the color thereof. Both oxidative bleaching techniques and reductive bleaching techniques are useful and, indeed, the preferred bleaching technique is a serial combination of the two techniques with the oxidative bleaching accomplished first, followed by reductive bleaching. Examples of conventional oxidative bleaching agents are peroxides (e.g. alkali metal or hydrogen), chlorites, peracids and ozone. Examples of conventional reductive bleaching agents are bisulfites, dithionites and borohydrides. Preferred bleaching techniques include oxidative bleaching with peracetic acid or hydrogen peroxide at a pH between about 5 and about 10, followed by reductive bleaching with dithionite.

Following bleaching, the bleached dietary fiber material is isolated from the bleaching medium by any convenient means, e.g. filtration, centrifugation, etc. The isolated fiber can be washed, e.g. with an alcohol, to further decrease the color thereof, but such washing is not critical to the invention in its broadest scope. The isolated fiber material is preferably dried, preferably under mild conditions, e.g. at less than 80° C., to form a free-flowing particulate.

The bleached dietary fiber material produced by the practice of this invention will have improved organoleptic properties thus improving its utility as a dietary fiber supplement. The supplement can be incorporated in a variety of foodstuffs which conventionally have, or are susceptible to incorporation of, a fibrous component. Typical examples of such foodstuffs include baked goods wherein the supplement is added to the dough before baking, e.g. bread (loaves, rolls, buns, and the like), crackers, cookies and biscuits.

The following examples illustrate the invention and are not intended to limit the scope thereof. All parts, percentages, and ratios are by weight unless noted otherwise.

EXAMPLE 1

Pre-acetylation and Peracetic Acid Oxidation

To a 2 liter round bottom flask was added 200 g. or corn bran (having a particle size such that at least 95% passed a No. 100 mesh (150 micrometer openings) screen and at least 90% passed a No. 200 mesh (75 micrometer openings) screen, available as Staley$^R$ Refined Corn Bran SRCB-Ultra from A. E. Staley Mfg. Co., Decatur, IL, hereinafter referred to as "ultrafine corn bran") and 800 g. water. The pH was adjusted to 10.0 by dropwise addition of 5% sodium hydroxide at room temperature. Acetic anhydride (14.2g) was added from a dropping funnel over a 23 minute period. The pH was maintained at 9-9.5 by simultaneous addition of 5% sodium hydroxide. After addition of acetic anhydride was complete, the mixture was allowed to stir at room temperature for 15 minutes. The pH was then adjusted to 7.0 with dilute hydrochloric acid, while increasing the temperature to 60° C. in a water bath. To the mixture was added 6.86 g. of a 35% solution of peracetic acid. After 2 hours, 0.53 g. of 15% sodium bisulfite solution was added followed by 2.0 g. of sodium dithionite. The mixture was stirred at 60° C. for 15 minutes. Then filtered and washed with water. The color of the dried product was measured using a Gardner color instrument. (Model XL-10, Gardner Laboratories, Inc., Bethesda, MD). The Gardner color numbers reported below are percent reflectance of wavelengths corresponding to G, A, and B which in turn correspond to the X, Y, and Z values of the 1931 Commission Internationale de l'Eclairage (CIE) as follows: G=(Y), A=1.277(X)−0.213(Z) and B=0.847(Z). In practice, the higher the G, A, and B numbers, the lighter the color of the product. A product having a B value lower than the G and A values indicates a yellow color.

The Gardner color of the product of Example 1: G-79.5, A-83.1, B-60.7.

The color the dry corn bran starting material: G-67.7, A-72.0, B-50.3.

EXAMPLE 2

Pre-acetylation and Peracetic Acid Oxidation

The procedure of Example 1 was repeated except that the amount of acetic anhydride was reduced to 9.5 g. Gardner Color: G-79.0, A-82.7, B-60.1.

COMPARATIVE EXAMPLE A

Non-acetylation and Peracetic Acid Oxidation

The procedure of Example 1 was repeated except that the acetylation step was omitted. Gardner Color: G-76.8, A-81.1, B-56.3

EXAMPLE 3

Pre-acetylation and Peracetic Acid Oxidation w/Alcohol Wash

The procedure of Example 1 was repeated except the wet filter cake was placed in a flask with 3A ethanol and stirred at 60° C. for 1 hour, filtered and washed with 3A ethanol. Gardner Color: G-83.8, A-86.5, B-69.1

COMPARATIVE EXAMPLE B

Non-acetylation and Peracetic Acid Oxidation w/Alcohol Wash

The procedure of Example 3 was repeated except the acetylation step was omitted. Gardner Color: G-80.6, A-83.8, B-63.5.

COMPARATIVE EXAMPLE C

Post-acetylation and Peracetic Acid Oxidation

To a 2 liter round bottom flask was added 200g ultrafine corn bran and 800g water. The flask was placed in a water bath set at 60° C. After temperature equilibration, 6.86g of a 35% solution of peracetic acid was added and mixed for 3 hours. After adding 0.40g of a 15% sodium bisulfite solution, the flask was purged with nitrogen and 2.0g of sodium dithionite was added. After 15 min, the pH was adjusted to 10.0 by addition of 5% sodium hydroxide solution. The pH was maintained at 9.5 to 10.0 while adding 14.2g of acetic anhydride, dropwise. After completing addition the mixture was stirred for 15 min. The pH was adjusted to 4.5 with dilute hydrochloric acid, filtered and washed within water. After air drying the Gardner color was measured. Gardner Color: G-66.9, A-71.9, B-41.9

COMPARATIVE EXAMPLE D

Non-acetylation w/Acetic Acid and Peracetic Acid Oxidation

To a 2 liter round bottom flask was added 200g of ultrafine corn bran and 800g water and 16.7g of glacial acetic acid. The pH was adjusted to 5.0 with 5% sodium hydroxide. The flask was placed in a 60° C. water bath and 6.86g of a 35% solution of peracetic acid was added. The mixture was stirred for 2 hours and then 0.8g of a 15% solution of sodium bisulfite was added. The flask was purged with nitrogen and 2.0g of sodium dithionite was added. After 30 minutes the mixture was filtered, washed with water and air dried. Gardner Color: G-77.7, A-81.6, B-58.9

COMPARATIVE EXAMPLE E

Pre-propoxylation and Peracetic Acid Oxidation

To a 2 liter round bottom flask was added 200g ultrafine corn bran and 800g water. The pH was adjusted to 10.0 by addition of 5% sodium hydroxide solution. After addition of 15.8g of propylene oxide, the flask was stoppered and stirred for 3 hours at room temperature. The flask was placed in a water bath at 60° C. and the pH adjusted to 7.0 with dilute hydrochloric acid. After temperature equilibration, 6.86g of a 35% solution of peracetic acid was added and allowed to stir for 1½ hours. After addition of 2.0g of a 15% solution of sodium bisulfite, 2.0g of sodium dithionite was added and allowed to stir at 60° C. for 15 minutes. The mixture was filtered, washed and air dried. Gardner Color: G-75.7, A-79.9, B-54.7

COMPARATIVE EXAMPLE E

Non-acetylation and Hydrogen Peroxide Oxidation

To a 2 liter flask was added 200g ultrafine corn bran and 800g of 0.1M solution of sodium bicarbonate and sodium hydroxide having a pH of 10.0. The flask was placed in a water bath at 60° C. The pH was adjusted to 9.0 with 2.5N sodium hydroxide. 17.4g of 30% hydrogen peroxide was added. The mixture was stirred and maintained at pH 8.5-9.0 for 90 min. The pH was then adjusted to 6.0 using 85% phosphoric acid. 8.0g of 15% sodium bisulfite solution was added to destroy excess hydrogen peroxide. The flask was purged with nitrogen and 3.3g of sodium dithionite was added. After 30 minutes the pH was adjusted to 4.5 with 85% phosphoric acid. The mixture was filtered, washed with water and air dried. Gardner Color: G-81.0, A-84,8, B-58.5.

COMPARATIVE EXAMPLE G

Non-acetylation and Hydrogen Peroxide Oxidation w/Alcohol Wash

The procedure of Comparative Example F was followed except that after filtration, the west cake was reslurried in 3A alcohol. The slurry was stirred at 60° C. for 1 hour, filtered and washed with 3A alcohol. Product was air dried. Gardner Color: G-82.9, A-86.0, B-64.4.

EXAMPLE 4

Pre-acetylation and Hydrogen Peroxide Oxidation w/Alcohol Wash

To a 2 liter round bottom flask was added 200g ultrafine corn bran and 800g water. The pH was adjusted to 9.0 with 5% sodium hydroxide solution. The pH was maintained at 8.5-9.0 within 5% sodium hydroxide while adding 14.2g of acetic anhydride dropwise. After addition was complete the mixture was stirred for 20 minutes at pH 8.5-9.0. The pH was then adjusted to 6.5 with 85% phosphoric acid and the flask was placed in a water bath at 60° C. 17.0g of 30% hydrogen peroxide solution was added and the pH was maintained at 6.5 by addition of 2.5N sodium hydroxide as needed. After 90 minutes 30g of a 15% solution of sodium bisulfite was added. The flask was purged with nitrogen and 3.3g of sodium dithionite was added. After 20 minutes the pH was adjusted to 4.5 with phosphoric acid. The mixture was filtered and washed with water. The wet cake was reslurried in 3A alcohol and stirred at room temperature for 1 hour. The product was filtered and air dried. Gardner color: G-86.5, A-89.0, B-67.7.

The results of Examples 1-3 and A-E are summarized in Table 1 below. The results of Examples 4, F, and G summarized in Table 2 below.

TABLE 1
Color of Peracetic Acid Oxidation Products

| Example | Acetylation | Alcohol Wash | Gardner Color G | A | B |
|---|---|---|---|---|---|
| Control | None | | 67.7 | 72.0 | 50.3 |
| 1 | Pre- | | 79.5 | 83.1 | 60.7 |
| 2 | Pre- | | 79.0 | 82.7 | 60.1 |
| A | Non- | | 76.8 | 81.1 | 56.3 |
| 3 | Pre- | X | 83.8 | 86.5 | 69.1 |
| B | Non- | X | 80.6 | 83.8 | 63.5 |
| C | Post- | | 66.9 | 71.9 | 41.4 |
| D | Non- | | 77.7 | 81.6 | 58.9 |
| E | Non-* | | 75.7 | 79.9 | 54.7 |

*Pre-propoxylated

The results shown in Table 1 indicate that none of the acetylation alternatives, including pre-propoxylation are as effective as pre-acetylation. Indeed, the post-acetylated material(Example C) had more color than the non-acetylated control(Example A).

TABLE 2
Color of Hydrogen Peroxide Oxidation Products

| Example | Acetylation | Alcohol Wash | Gardner Color G | A | B |
|---|---|---|---|---|---|
| F | Non | | 81.0 | 84.8 | 58.5 |
| G | Non | X | 82.9 | 86.0 | 64.4 |
| 4 | Pre | X | 86.5 | 89.0 | 67.7 |

The results shown in Table 2 indicate that substitution of hydrogen peroxide for peracetic acid yields similar results.

EXAMPLE 5

The following example illustrates a post-bleaching oxidation of residual sulfites to decrease the level of residual sulfites and thereby improve the bran's utility as a dietary supplement and a method useful for determining the level of acetylation of the corn bran.

In a 10 gallon tank reactor 5.5 kg of ultrafine corn bran was added to 23.5 kg of water. The pH was adjusted to 9.0 with a 5% solution of sodium hydroxide. Acetic anhydride (390.5g) was added over a 35 minute period. The pH was maintained at 8.5 - 9.0 by simultaneous addition of a 5% solution of sodium hydroxide. The mixture was stirred at room temperature for 10 minutes for addition of acetic anhydride was complete. The pH was adjusted to 5.0 with 85% phosphoric acid and the mixture was heated to 50° C. A 35% peracetic acid solution was added and allowed to stir for five hours. Excess peracetic acid was destroyed by addition of 34g of a 15% aqueous solution of sodium bisulfite. The reactor was purged with nitrogen and heated to 60° C. Sodium dithionite (55.0g) was added and allowed to stir for 30 minutes. The mixture was then cooled to room temperature and purged with air for 2½ hours to oxidize excess sodium dithionite. Sulfite byproducts were oxidized to sulfate by addition of 72g of 30% aqueous hydrogen peroxide. The slurry was filtered and washed with water. The wet filter cake was reslurried in sufficient 3A alcohol to produce a 75% alcohol, 25% water solvent mixture accounting for water in the filter cake. The slurry was stirred for 30 minutes at room temperature and filtered. The product was air dried at room temperature.

Gardner color: G81.9 A-85.5 B-63.7

The bleached bran was analyzed for acetate by saponification with 0.33N sodium hydroxide at 50° C. for 6 hours. The filtrate was analyzed for acetate ion by HPLC using a Biorad HPX87H ion exclusion column. The mobile phase was 1mM octanesulfonic acid at a flow rate of 0.5ml/min. Ions were detected by a conductivity detector. The bleached bran was found to contain 1.2% acetate. Unbleached bran contained 371ppm (0.037%) acetate.

What is claimed is:

1. A method of decreasing the color of a dietary fiber material consisting essentially of esterifying a dietary fiber material with an esterifying agent to form an esterified dietary fiber material and then bleaching said esterified dietary fiber material, wherein said bleaching comprises oxidative bleaching.

2. A method of claim 1 wherein said bleaching comprises bleaching with an oxidative bleach selected from the group consisting of peroxides, chlorites, peracids and ozone.

3. A method of claim 1 wherein said bleaching is accomplished by first oxidatively bleaching said esterified dietary fiber material and then reductively bleaching said esterified dietary fiber material.

4. A method of claim 1 wherein said bleaching is accomplished by first oxidatively bleaching with a member selected from the group consisting of peroxides, chlorites, peracids and ozone, and then reductively bleaching with a member selected from the group consisting of bisulfites, dithionites and borohydrides.

5. A method of claim 4 wherein said esterifying agent is acetic anhydride.

6. A method of claim 1 wherein said dietary fiber material is residue from the milling of plant seeds.

7. A method of claim 6 wherein said plant seeds are cereal grains or oilseeds.

8. A method of claim 1 wherein said dietary fiber material is corn bran.

9. A method of claim 1 wherein said dietary fiber material is a vegetable, a cereal, or a fruit.

10. A method of decreasing the color of corn bran comprising:
    (a) reacting corn bran with an amount of an esterifying agent selected from the group consisting of lower aliphatic carboxylic acids having from 1 to 4 aliphatic carbon atoms, and halides, esters, or anhydrides thereof, sufficient to form a corn bran reaction product having from about 0.1% to about 5% by weight of esterifying agent covalently bonded thereto;
    (b) then oxidatively bleaching said corn bran reaction product with a member selected from the group consisting of peroxides, chlorites, peracids and ozone; and
    (c) then reductively bleaching said oxidatively bleached corn bran reaction product with a member selected from the group consisting of bisulfites, dithionites and borohydrides.

* * * * *